United States Patent
Rajvanshi et al.

(10) Patent No.: US 10,077,050 B2
(45) Date of Patent: Sep. 18, 2018

(54) AUTOMATED DRIVING SYSTEM FOR EVALUATING LANE CUT-OUT AND METHOD OF USING THE SAME

(71) Applicant: GM GLOBAL TECHNOLOGY OPERATIONS LLC, Detroit, MI (US)

(72) Inventors: Akshat Rajvanshi, Farmington Hills, MI (US); Kevin A. O'Dea, III, Ann Arbor, MI (US); Kevin P. Conrad, III, South Lyon, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 148 days.

(21) Appl. No.: 15/163,508

(22) Filed: May 24, 2016

(65) Prior Publication Data

US 2017/0341647 A1 Nov. 30, 2017

(51) Int. Cl.
| | |
|---|---|
| *B60W 30/14* | (2006.01) |
| *G05D 1/00* | (2006.01) |
| *B60W 30/08* | (2012.01) |
| *B60W 30/09* | (2012.01) |
| *B60W 30/10* | (2006.01) |
| *B60W 30/12* | (2006.01) |
| *G05D 1/02* | (2006.01) |

(52) U.S. Cl.
CPC ............ *B60W 30/14* (2013.01); *B60W 30/08* (2013.01); *B60W 30/09* (2013.01); *B60W 30/10* (2013.01); *B60W 30/12* (2013.01); *G05D 1/0088* (2013.01); *G05D 1/021* (2013.01); *B60W 2550/10* (2013.01); *B60W 2550/30* (2013.01); *B60W 2550/306* (2013.01)

(58) Field of Classification Search
None
See application file for complete search history.

(56) References Cited

U.S. PATENT DOCUMENTS

2004/0230375 A1* 11/2004 Matsumoto ......... B60T 8/17557
701/301

* cited by examiner

*Primary Examiner* — Mussa A Shaawat
*Assistant Examiner* — Kyung J Kim
(74) *Attorney, Agent, or Firm* — Reising Ethington, P.C.

(57) ABSTRACT

The methods and system described herein may be used to assist an automated driving system of a host vehicle. The methods and system may, in an exemplary embodiment, be used to determine whether a host vehicle or a target vehicle is cutting out and, accordingly, control the acceleration and/or other driving features of the host vehicle. Generally, the methods described herein contain the steps of determining that a vehicle is cutting out, determining which vehicle is cutting out, and then controlling the acceleration of the host vehicle based on the previous determinations. The determination of which vehicle is cutting out is made based on readings gathered by the host vehicle from one or more automated driving sensors. By using target vehicle sensor data in conjunction with lane marking sensor data, the host vehicle can determine, not only that a vehicle is cutting out, but which vehicle(s) are cutting out.

21 Claims, 5 Drawing Sheets

AUTOMATED DRIVING SYSTEM FOR EVALUATING LANE CUT-OUT AND METHOD OF USING THE SAME

FIELD

The present invention generally relates to autonomous or semi-autonomous vehicle systems and, more specifically, to autonomous or semi-autonomous systems like an adaptive cruise control system that controls the acceleration of a host vehicle.

BACKGROUND

Autonomous or semi-autonomous vehicle systems have been developed to aid vehicle operators in driving a vehicle and/or to perform automated operation of the vehicle with no operator intervention needed. These systems generally use vehicle sensors and other positional tools to control one or more aspects of vehicle operation. While autonomous vehicle systems are still being developed, many vehicle systems that are currently available provide autonomous or semi-autonomous driving features, such as adaptive cruise control (ACC). ACC systems allow a vehicle operator to set a desired speed without having to reset and/or adjust such speed when a slower leading vehicle inhibits the vehicle from cruising at the set desired speed. However, these systems are not without their drawbacks.

For example, in current ACC systems, one or more sensors may be used to track a target vehicle that is in front of the host vehicle and to determine the relative position of the target vehicle with respect to the host vehicle. While this relative positional information may be useful in terms of maintaining a safe following distance, it may not be enough by itself to determine whether the host vehicle, target vehicle, or both vehicles are switching lanes and how to control the host vehicle in response thereto. With sufficient information to determine which vehicle is switching lanes or "cutting out", vehicle autonomous or semi-autonomous systems, such as ACC systems, may be able to operate more favorably, thereby creating a better passenger and/or operator experience.

SUMMARY

According to one embodiment, there is provided a method for use with an automated driving system installed on a host vehicle, the automated driving system comprises one or more automated driving sensor(s) and an automated driving control unit, and the method comprises the steps of: gathering target vehicle readings and lane marking readings from the one or more automated driving sensor(s); predicting a lane cutout maneuver by the host vehicle or a leading target vehicle using the target vehicle readings, the lane cutout maneuver prediction is at least partially based on a relative lateral position ($x_{lat}$) of the host vehicle with respect to the leading target vehicle; determining if the lane cutout maneuver is being performed by the host vehicle, by the leading target vehicle, or by both the host and the leading target vehicles, the lane cutout maneuver determination is at least partially based on a lateral distance between the host vehicle and a lane marking ($x_{right}$, $x_{left}$); and controlling acceleration of the host vehicle with the automated driving system during the lane cutout maneuver, wherein the acceleration control is at least partially based on the lane cutout maneuver prediction and the lane cutout maneuver determination.

According to another embodiment, there is provided a method for use with an automated driving system installed on a host vehicle, the automated driving system comprises one or more automated driving sensor(s) and an automated driving control unit, and the method comprises the steps of: gathering target vehicle readings and lane marking readings from the one or more automated driving sensor(s); determining if a lane cutout maneuver is being performed by the host vehicle, by a leading target vehicle, or by both the host and the leading target vehicles, the lane cutout maneuver determination is at least partially based on a lateral distance between the host vehicle and a lane marking ($x_{right}$, $x_{left}$); confirming an availability of an adjacent lane when the lane cutout maneuver is being performed by the host vehicle or confirming an availability of a current lane when the lane cutout maneuver is being performed by the leading target vehicle; and controlling acceleration of the host vehicle with the automated driving system during the lane cutout maneuver, wherein the acceleration control is at least partially based on the lane cutout maneuver determination and the adjacent lane or current lane availability confirmation.

According to another embodiment, there is provided an automated driving system installed in a host vehicle, comprising: one or more automated driving sensor(s) configured to gather target vehicle readings and lane marking readings; and an automated driving control unit configured to: predict a lane cutout maneuver by the host vehicle or a leading target vehicle using the target vehicle readings, wherein the lane cutout maneuver prediction is at least partially based on a relative lateral position ($x_{lat}$) of the host vehicle with respect to the leading target vehicle; determine if the lane cutout maneuver is being performed by at least one of the host vehicle, the leading target vehicle, or both the host and the leading target vehicles, wherein the lane cutout maneuver determination is at least partially based on a lateral distance between the host vehicle and a lane marking ($x_{right}$, $x_{left}$); and control acceleration of the host vehicle with the automated driving system during the lane cutout maneuver, wherein the acceleration control is at least partially based on the lane cutout maneuver prediction and the lane cutout maneuver determination.

DRAWINGS

Preferred exemplary embodiments will hereinafter be described in conjunction with the appended drawings, wherein like designations denote like elements, and wherein.

DESCRIPTION

The methods and system described herein may be used with any number of autonomous or semi-autonomous vehicle systems, such as an adaptive cruise control (ACC) system. The methods and system may, in an exemplary embodiment, be used to determine whether a host vehicle or a target vehicle is cutting out and, accordingly, control the acceleration and/or other driving features of the host vehicle. As used herein, the term "cutout" (or "cut out") means to initiate or at least partially begin a lane change or lane departure from the subject vehicle's current lane. Generally, the methods described herein contain the steps of determining that a vehicle is cutting out, determining which vehicle is cutting out (e.g., a target vehicle or the host vehicle), and then controlling the acceleration of the host vehicle in an anticipatory manner based on the previous determinations in an effort to somewhat imitate human driving behavior. The determination of which vehicle is cutting out is made based on target vehicle sensor data and lane marking sensor data gathered by the host vehicle from one or more automated driving sensors. By using the target vehicle sensor data in conjunction with lane marking sensor data, the host vehicle can determine, not only that a vehicle is cutting out, but which vehicle is cutting out and how to react in response thereto.

Figure 1:
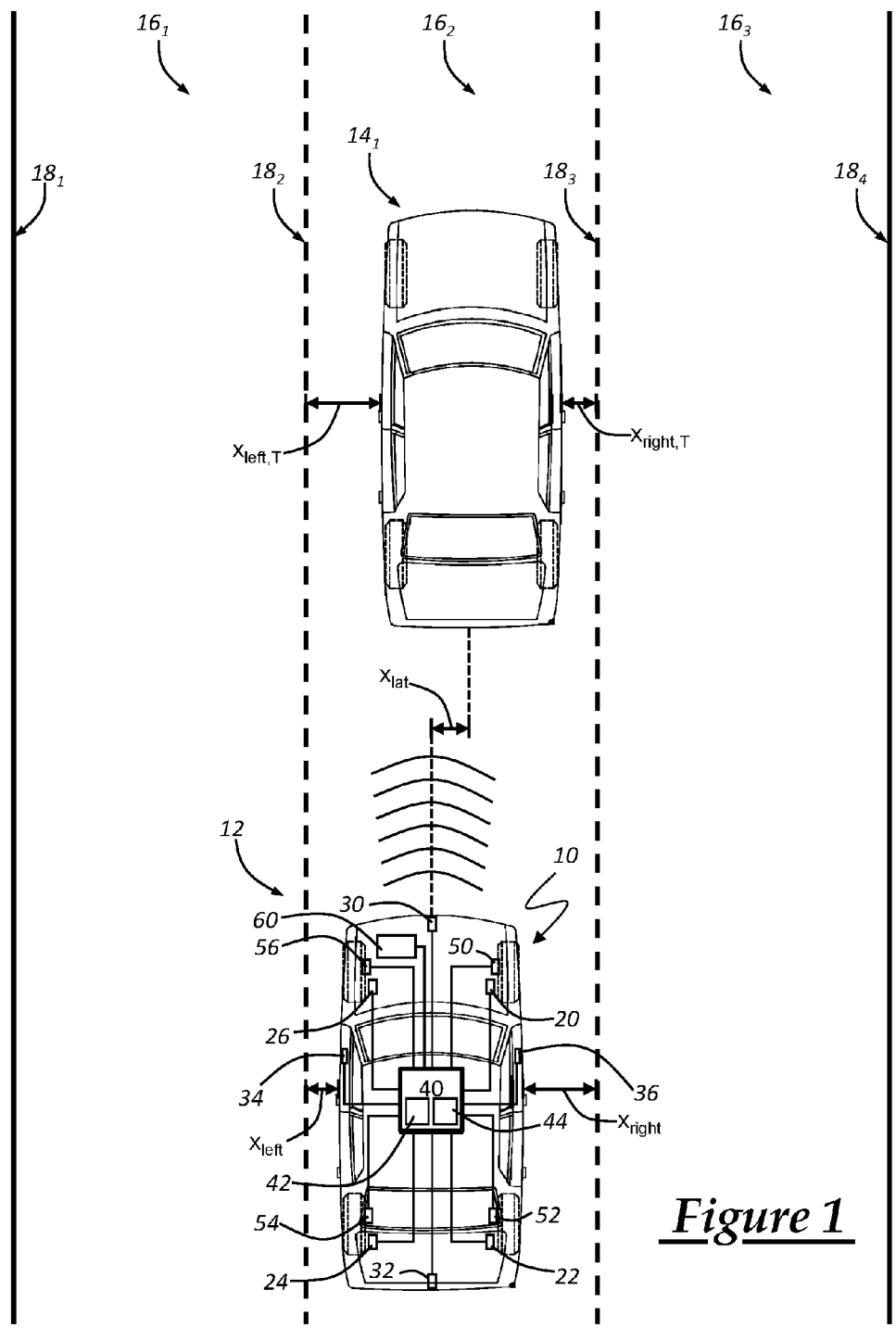
FIG. 1 is a schematic view illustrating a host vehicle having an exemplary automated driving system installed thereon and a target vehicle ahead of the host vehicle.

With reference to FIG. 1, there is shown a general and schematic view of an exemplary automated driving system 10 that is installed on a host vehicle 12 and that may be used to improve maneuvering around target vehicles 14 (only one shown). The term "automated driving system" is not limited to fully autonomous vehicle systems and may be used with any suitably autonomous or semi-autonomous vehicle system (e.g., Levels 0-4 of the National Highway Traffic Safety Administration's (NHTSA) scale of vehicle automation). Furthermore, the present system and method may be used with any type of vehicle, including traditional vehicles, hybrid electric vehicles (HEVs), extended-range electric vehicles (EREVs), battery electrical vehicles (BEVs), motorcycles, passenger vehicles, sports utility vehicles (SUVs), cross-over vehicles, trucks, vans, buses, recreational vehicles (RVs), etc. These are merely some of the possible applications, as the system and methods described herein are not limited to the exemplary embodiments described herein and illustrated in FIGS. 1-5, and may be implemented in any number of different ways.

According to one example, automated driving system 10 includes automated driving sensors, such as vehicle sensors 20-26, target sensors 30-32, and lane marking sensors 34-36, as well as a control module 40, one or more braking devices 50-56, and an engine control module 60. As used herein, an "automated driving sensor" is a sensor that is capable of gathering information for the automated driving system that may enable better operation of one or more autonomous or semi-autonomous feature(s) of the host vehicle. For example, such information may pertain to the host vehicle, one or more target vehicle(s), lane markers, other roadway attributes or conditions, other traffic information, environmental conditions (e.g., the weather), etc.

Any number of different sensors, devices, modules, and/or systems may provide automated driving system 10 with information or input that can be used by the present method. These include, for example, the exemplary sensors shown in FIG. 1, as well as other sensors that are known in the art but are not shown here. It should be appreciated that vehicle sensors 20-26, target sensors 30-32, lane sensors 34-36, as well as any other sensor utilized by automated driving system 10 may be embodied in hardware, software, firmware or some combination thereof. These sensors may directly sense or measure the conditions or characteristics for which they are provided, or they may indirectly evaluate such conditions or characteristics based on information provided by other sensors, devices, modules, systems, etc.

Furthermore, these automated driving sensors may be electronically coupled to control module 40 in a number of ways well known in the art, such as, for example, through one or more wires or cables, a communications bus, a network, through a wireless connection, etc. These sensors may be integrated within another vehicle device, module, system, etc. (e.g., sensors integrated within an engine control module (ECM), traction control system (TCS), electronic stability control (ESC) system, antilock brake system (ABS), etc.), they may be stand-alone components (as schematically shown in FIG. 1), or they may be provided according to some other arrangement. It is possible for any of the various sensor readings described below to be provided by some other device, module, system, etc. in host vehicle 12 instead of being directly provided by an actual sensor element. In some instances, multiple sensors may be employed to sense a single parameter (e.g., for providing redundancy, security, etc.). It should be appreciated that the foregoing scenarios represent only some of the possibilities, as any type of suitable sensor arrangement may be used by automated driving system 10, and therefore, system 10 is not limited to any particular sensor or sensor arrangement.

Vehicle sensors 20-26 may provide automated driving system 10 with a variety of host vehicle readings and/or other information that can be used by the present method. In one embodiment, vehicle sensors 20-26 generate host vehicle readings that are representative of the position, velocity, acceleration and/or other dynamics of host vehicle 12. Some examples of such host vehicle readings include a host vehicle velocity reading, a host vehicle acceleration reading, and a host vehicle yaw rate reading. Vehicle sensors 20-26 may utilize a variety of different sensors and sensing techniques, including those that use rotational wheel speed, ground speed, accelerator pedal position, gear shifter selection, accelerometers, engine speed, engine output, throttle valve position, and inertial measurement unit (IMU) output, to name a few. In the example shown in FIG. 1, individual wheel speed sensors 20-26 are coupled to each of the host vehicle's four wheels and separately report the rotational velocity of the four wheels. Skilled artisans will appreciate that these sensors may operate according to optical, electromagnetic or other technologies, and that other vehicle readings may be derived or calculated from the output of these sensors, such as vehicle acceleration. In another embodiment, vehicle sensors 20-26 determine vehicle speed relative to the ground by directing radar, laser, and/or other signals towards the ground and analyzing the reflected signals, or by employing feedback from a Global Positioning System (GPS). As mentioned above, vehicle sensors 20-26 may be part of some other device, module, system, etc., like an anti-lock braking system (ABS).

Target sensors 30-32 also provide automated driving system 10 with a variety of target vehicle readings and/or other information that can be used by the present method. In one example, target sensor 30 generates target vehicle readings that are representative of the respective position, velocity, and/or acceleration of one or more target vehicles 14 or other target objects. These readings may be absolute in nature (e.g., a target vehicle velocity reading or a target vehicle acceleration reading) or they may be relative in nature (e.g., a relative velocity reading which is the difference between target and host vehicle velocities, or a relative acceleration reading which is the difference between target and host vehicle accelerations). These target vehicle readings can pertain to longitudinal readings (e.g., the relative longitudinal velocity; how fast one vehicle is traveling down the road compared to the other) or lateral readings (e.g., the relative lateral velocity; how fast one vehicle is drifting out of a lane compared to the other). In one example, target sensor 30 may include a camera that captures images of a target vehicle 14 that is positioned in front of host vehicle 12. Then, the images may be processed to obtain distances $x_{left,T}$ and $x_{right,T}$, which may indicate the distance between the respective side of the target vehicle and a lane marker, such as lane markers $18_2$ and $18_3$. Target sensor 30 may be a single sensor or a combination of sensors, and may include, for example and without limitation, a light detection and ranging (LIDAR) device, a radio detection and ranging (RADAR) device, a vision device (e.g., camera, etc.), a vehicle-to-vehicle communications device, or a combination thereof.

Lane marking sensors 34-36 gather lane marking readings that can be provided to automated driving system 10 and used by the present method. In one embodiment, the lane marking sensors are cameras that capture images of the road on the sides and/or in front of the host vehicle wherein lane markers may be located, such as the dashed lane markers shown at $18_2$ and $18_3$ or the solid lane markers shown at $18_1$ and $18_4$. Then, through processing the captured images and/or other lane marking readings using image processing software or firmware, one or more lane markers may be identified. In a different embodiment, road side sensors send wireless signals to the host vehicle that can be used by the present method. Additionally, features, attributes, readings, measurements, and/or properties may be determined through evaluation of the images and/or other lane marking readings collected by the system 10. The processing may be carried out by processing device 44 in control module 40, by the lane marking sensors 34-36, or other device capable of processing the images. In one example, the lane marking readings include the distance between the left side of host vehicle 12 and a lane marker $18_2$, distance $x_{left}$, and may be determined through image processing of images captured by sensor 34 on the left side of vehicle 12. Similarly, lane marking sensor 36 may determine the distance $x_{right}$.

In other embodiments, $x_{left}$ and $x_{right}$ may be calculated using different reference points. For $x_{left}$, such distance may be the distance between the midpoint of the host vehicle 12 and the lane marker $18_2$, the distance between the left side of the host vehicle 12 and another lane marker located to the left of the host vehicle (e.g., lane marker $18_1$). Similarly, the same is true for $x_{right}$ with respect to the right side as opposed to the left side. Furthermore, other distances may be calculated using the lane marking sensors 34-36, such as those distances between a reference point on a target vehicle and a lane marker (e.g., $x_{left}$ and $x_{right}$ where, instead of the distance relating to the host vehicle, it relates to a target vehicle). It should be appreciated that $x_{left,T}$ and $x_{right,T}$ may be calculated in a like manner, however, with respect to the target vehicle as opposed to the host vehicle.

In addition to the above, in various embodiments, a camera or other vision device could be used in conjunction with one or more of sensors 30-36. For instance, a forward viewing camera could be located towards the center of the windshield and arranged to detect lane markings in the current lane $16_2$, in one or more adjacent lanes $16_1$, $16_3$, or some combination thereof. Accordingly, automated driving system 10 is not limited to any particular type of sensor or sensor arrangement, specific technique for gathering or processing sensor readings, or particular method for providing sensor readings, as the embodiments described herein are simply meant to be exemplary. Vehicle sensors 20-26, target sensors 30-32, and lane marking sensors 34-36 are all examples of automated driving sensors.

Control module 40 may be, in one embodiment, an automated driving control unit. Control module 40 may include any variety of electronic processing devices, memory devices, input/output (I/O) devices, and/or other known components, and may perform various control and/or communication related functions. In an exemplary embodiment, control module 40 includes an electronic memory device 42 that stores various sensor data (e.g., vehicle sensor data, target vehicle sensor data, and lane marking sensor data from automated driving sensors 20-26, 30-32, and 34-36), look up tables or other data structures, algorithms (e.g., those that may be utilized in the method described below), various threshold values, etc. Memory device 42 may also store pertinent characteristics and background information pertaining to vehicle 12, such as information relating to stopping distances, deceleration limits, maximum braking capability, turning radius, temperature limits, moisture or precipitation limits, driving habits or other driver behavioral data, etc. Control module 40 may also include an electronic processing device 44 (e.g., a microprocessor, a microcontroller, an application specific integrated circuit (ASIC), etc.) that executes instructions for software, firmware, programs, algorithms, scripts, etc., that are stored in memory device 42 and may govern and perform the processes and methods described herein. Control module 40 may be electronically connected to other vehicle devices, modules and systems via suitable vehicle communications and can interact with them when required. These are, of course, only some of the possible arrangements, functions and capabilities of control module 40, as other embodiments could also be used.

Depending on the particular embodiment, control module 40 may be a stand-alone vehicle electronic module (e.g., an object detection controller, a safety controller, etc.), it may be incorporated or included within another vehicle electronic module (e.g., an integrated controller within the unit that includes the target sensors, a park assist control module, electronic brake control module (EBCM), etc.), or it may be part of a larger network or system (e.g., an active safety system, a traction control system (TCS), electronic stability control (ESC) system, antilock brake system (ABS), driver assistance system, adaptive cruise control (ACC) system, lane departure warning system, etc.), to name a few possibilities. Accordingly, control module 40 is not limited to any one particular embodiment or arrangement.

Braking devices 50-56 may be a part of any suitable vehicle brake system, including systems associated with disc brakes, drum brakes, electro-hydraulic braking, electromechanical braking, regenerative braking, brake-by-wire, etc. In an exemplary embodiment, braking devices 50-56 are disc brakes and each generally includes a rotor, a caliper, a piston, and brake pads (not shown) and may be part of an electro-hydraulic braking (EHB) system. As is appreciated by skilled artisans, a tire-wheel assembly (not shown) is attached to a hub with several lug nuts so that the tire, wheel, hub, and rotor can all co-rotate together. A brake caliper straddles the rotor and carries a brake piston so that a compressive and frictional brake force can be applied by brake pads to opposing sides of the rotor during a braking event. The frictional brake forces slow the rotation of the rotor and hence the rotation of the tire-wheel assembly and ultimately the vehicle. The brake pistons for each of the different wheels or corners may be: all controlled in unison, controlled on a wheel-by-wheel basis, controlled in groups (e.g., the front wheels are controlled separately from the rear wheels), or controlled according to some other known method. Again, it should be appreciated that the preceding description of braking devices 50-56 is only provided for purposes of illustration. The methods described herein may be used with any number of different braking devices including those found in electro-mechanical braking systems (EMB) or other brake-by-wire systems. For instance, braking devices 50-56 could be substituted with other suitable components, such as electro-mechanical brakes having electric calipers (e-calipers), drum brakes, and hybrid vehicle brakes that use regenerative braking.

Engine control module (ECM) 60 is preferably designed to govern one or more aspects of vehicle propulsion by controlling an internal combustion engine, an electric motor, a combination thereof, or other vehicle propulsion mechanism. In an exemplary embodiment, the control module 40 is connected via a communications bus to ECM 60. Control module 40 may then direct ECM 60 to increase, decrease, or maintain the propulsion of the internal combustion engine of vehicle 12. In addition, or in another embodiment, ECM 60 may be connected to braking devices 50-56 and may operate in conjunction therewith.

Turning now to FIGS. 2A-2D, there are shown several different potential scenarios that a host vehicle 12 may encounter while driving with the assistance of automated driving system 10. In these scenarios and in the corresponding description, it is assumed that system 10 is an adaptive cruise control (ACC) system and that the host vehicle 12 is following a slower moving leading target vehicle 14 before a cut-out event starts to occur. The figures each show at least one target vehicle 14 that is in front of the host vehicle 12. The arrows indicate where the vehicle (host vehicle in FIGS. 2A-2C and target vehicle $14_1$ in FIG. 2D) is heading and/or intending to head (i.e., the direction of a cut-out maneuver). FIGS. 2A-2D will be used in conjunction with FIG. 1 to facilitate the description of the exemplary embodiments presented below by providing an illustrative reference to some scenarios in which the methods, shown in FIGS. 3-5, may be used. It should be appreciated that the scenarios depicted in FIGS. 2A-2D are non-limiting and are only a few of the large number of possible scenarios a host vehicle may encounter.

Figure 3:
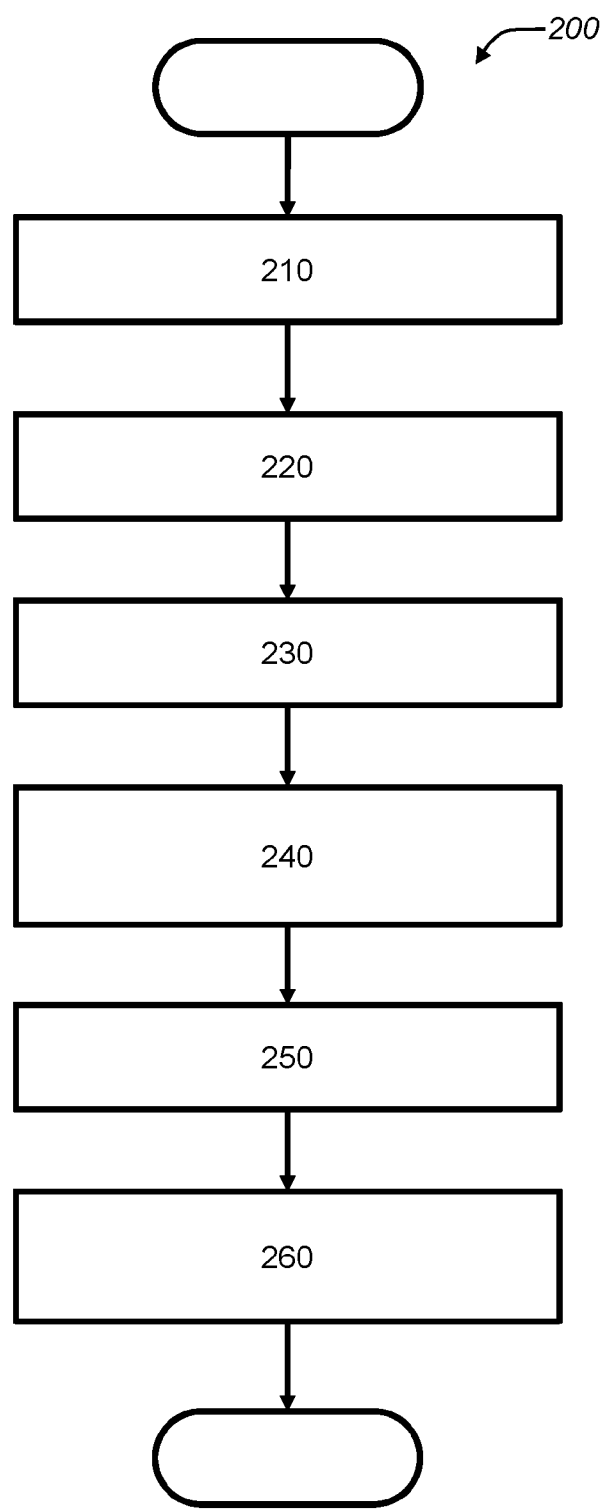
FIG. 3 is a flowchart illustrating an exemplary method for use with an automated driving system installed on a host vehicle, such as the system shown in FIG. 1.

Turning now to FIG. 3, there is shown an exemplary method 200 for use with an automated driving system 10 installed on a host vehicle 12. The automated driving system comprises one or more automated driving sensor(s) and an automated driving control unit, such as those previously described. Although the description below is primarily discussed with reference to a leading target vehicle $14_1$, it should be appreciated that the discussion below is non-limiting and applicable to trailing and/or nearby/adjacent target vehicles as well.

The method 200 begins with step 210 wherein the automated driving system 10 on the host vehicle 12 gathers target vehicle readings from one or more automated driving sensor(s). In one embodiment, the target sensors 30-32 may gather information relating to a relative lateral position between host vehicle 12 and target vehicle $14_1$ ($x_{lat}$). Additionally, or alternatively, the control module 40 may receive host vehicle readings from the vehicle sensors 20-26 that are representative of, or that correspond to, values of certain conditions/parameters, such as, a host vehicle velocity, a relative velocity with respect to a target vehicle, a relative distance with respect to a target vehicle, an actual target vehicle velocity, and/or an identification of a lane in which a target vehicle 14 or the host vehicle 12 is located. These readings and/or signals may then be stored in memory, such as electronic memory device 42 in control module 40.

In step 220, the automated driving system 10 gathers lane marking readings from one or more automated driving sensor(s). For example, the lane marking sensors 34-36 may be used to gather or capture information relating to one or more lane markers, such as distances $x_{left}$ and $x_{right}$. The distances $x_{left}$ and $x_{right}$ may be calculated as the distance between the host vehicle and the lane marking on the respective side of the host vehicle's current lane (e.g., $x_{left}$ being the distance between the left most side of host vehicle 12 and a lane marking of lane $18_2$ and $x_{right}$ being the distance between the right most side of host vehicle 12 and a lane marking of lane $18_3$). Alternatively, the distances $x_{left}$ and $x_{right}$ may be the distance between another lane on the respective side and the host vehicle (e.g., $x_{left}$ being the distance between the left most side of host vehicle 12 and a lane marking of lane $18_1$ and $x_{right}$ being the distance between the right most side of host vehicle 12 and a lane marking of lane $18_4$). In other embodiments, the distances may be the distance between the center of host vehicle 12 and one or more lane markings of a lane. Other embodiments include any distance between one or more lane markings of a lane and one or more reference points of host vehicle 12 and/or target vehicle(s) 14.

In one embodiment, the lane marking sensors 34-36 may be cameras that capture images of the road surface adjacent to the host vehicle. The captured images may then be processed by the sensors 34-36 and/or processed by processing device 44 of control module 40 to determine information pertaining to one or more lane markers 18, such as distances $x_{left}$ and/or $x_{right}$. The results of the image processing may be used with other information, such as that information gathered in step 210 to make further determinations regarding the lane markers, such as to determine the distances $x_{left}$ and $x_{right}$ and/or whether the target vehicle(s) are in the same lane as host vehicle 12 or in an adjacent lane to host vehicle 12.

In another embodiment, the sensors 34-36 and/or target vehicle sensors 30-32 may be cameras that capture images of one or more target vehicle(s) 14 and/or the road near the target vehicle(s). This information may then be processed by sensors 30-36 themselves or by processing device 44 to determine lane marking information pertaining to the one or more target vehicle(s), such as distances $x_{left}$ and/or $x_{right}$ that correspond to the target vehicle(s) and one or more lane markers 18. Additionally, other information may be obtained from this lane marking sensor data, such as the identity of the lane in which the target vehicle(s) are in or whether the target vehicle(s) are in the same lane as the host vehicle. In any event, it should be appreciated that steps 210 and 220 may be carried out in any order and/or in a concurrent fashion and that the order presented by FIG. 2 is merely exemplary.

In step 230, the automated driving system 10 predicts a lane cutout maneuver by the host vehicle or a leading target vehicle using the target vehicle readings. The lane cutout maneuver determination is at least partially based on a relative lateral position or distance of the host vehicle with respect to the leading target vehicle ($x_{lat}$). In one embodiment, the relative lateral position ($x_{lat}$) is obtained in step 210 by evaluating the target vehicle readings and/or host vehicle readings that may be gathered by sensors 20-32. For example, if the relative lateral position ($x_{lat}$) between the host vehicle and the leading target vehicle $14_1$ is more than a threshold amount, the automated driving system 10 may predict that a cutout maneuver by either the target vehicle $14_1$ or the host vehicle 12 is taking place. In addition, a change in relative lateral position ($x_{lat}$) over time may be calculated by taking multiple readings and/or sensor data from the sensors 20-26 and/or 30-32. This change in relative lateral position ($x_{lat}$) over time may be used to make a more accurate prediction, as it mitigates false positives that may occur from merely using one relative lateral distance. This may particularly be useful in the case where the host vehicle 12 and target vehicle $14_1$ are drifting in the same lane. Other techniques for predicting a lane cutout maneuver based at least partially on relative lateral position $x_{lat}$ may be used, including using relative lateral velocity $v_{lat}$ or other parameters derived from $x_{lat}$. Of course, yaw rate, steering wheel angle, and other vehicle parameters may also be used in this lane cutout prediction. After it is determined that a cutout maneuver is being performed, step 240 is carried out.

In step 240, the automated driving system 10 determines if the lane cutout maneuver is being performed by the host vehicle or by the leading target vehicle. In other embodiments, the automated driving system may determine whether a lane cutout maneuver is being performed by a trailing target vehicle or a nearby/adjacent target vehicle. In any event, the lane cutout maneuver determination may be at least partially based on the lateral distance between the host vehicle and a lane marking ($x_{left}$, $x_{right}$).

Figure 4:
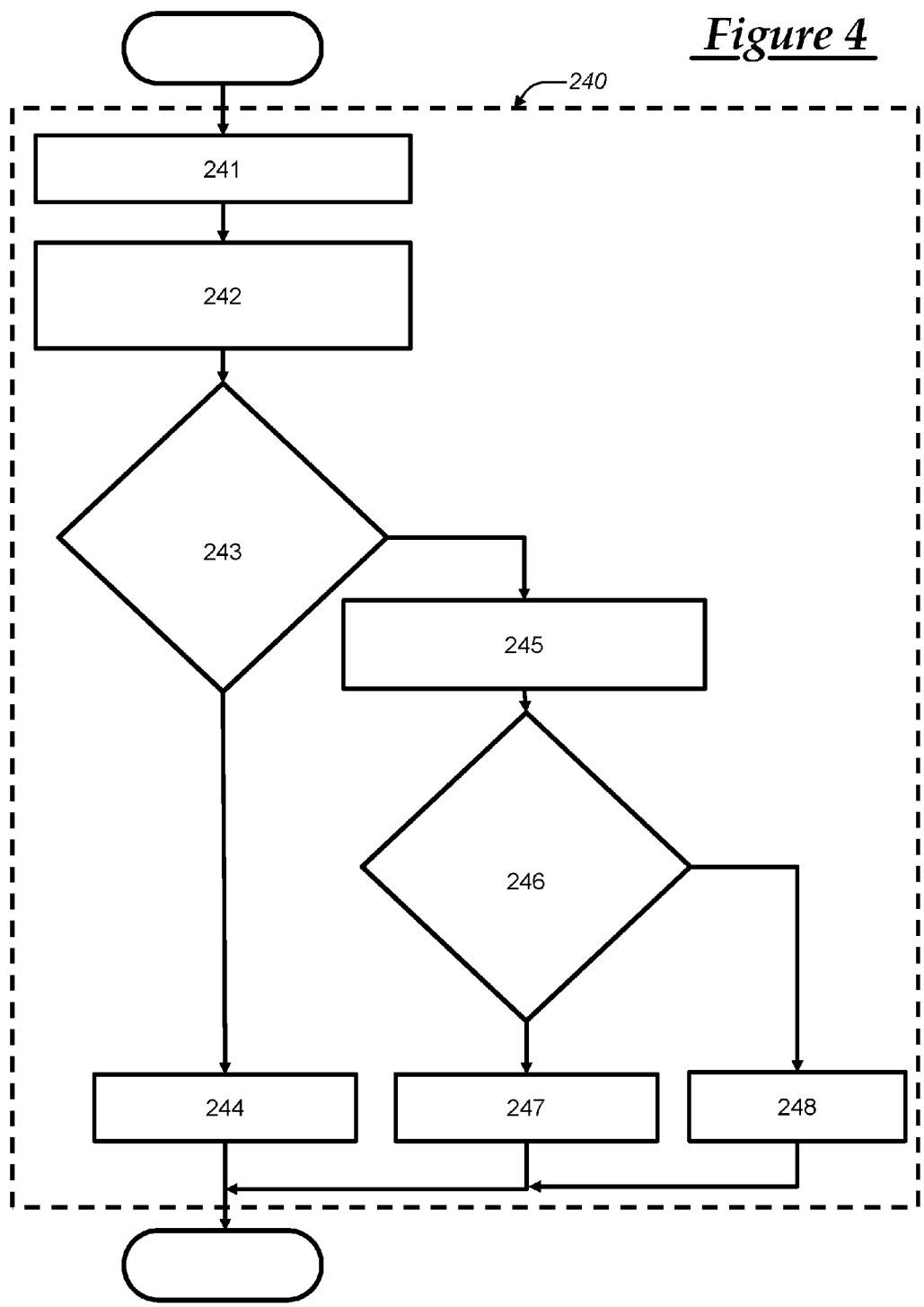
FIG. 4 is a flowchart illustrating an exemplary embodiment of a determining step of the method illustrated in FIG. 3.

Referring now to FIG. 4, there is provided a more detailed flowchart of an exemplary embodiment of a determining step 240 of the method illustrated in FIG. 3. The exemplary embodiment of step 240 illustrates steps 241-248, and begins with step 241 wherein it is determined if the relative lateral velocity ($v_{lat}$) is to the right, to the left, or neither. This determination may be based on the signals gathered in steps 210 and/or 220, as well as any other calculations that may be or were derived therefrom, such as the relative lateral position ($x_{lat}$) of the host vehicle with respect to a target vehicle.

Figure 2A:
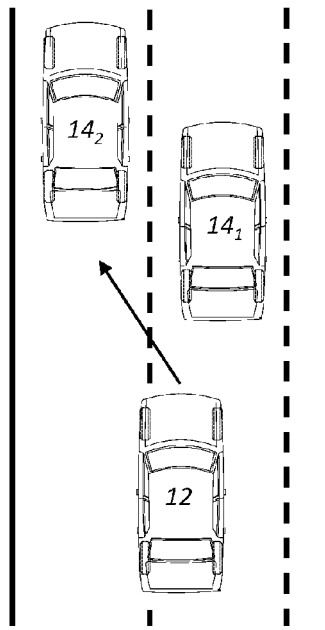
FIG. 2A is a schematic view illustrating a scenario of a host vehicle cutting out from a lane with a first target vehicle into a lane with a second target vehicle.
Figure 2B:
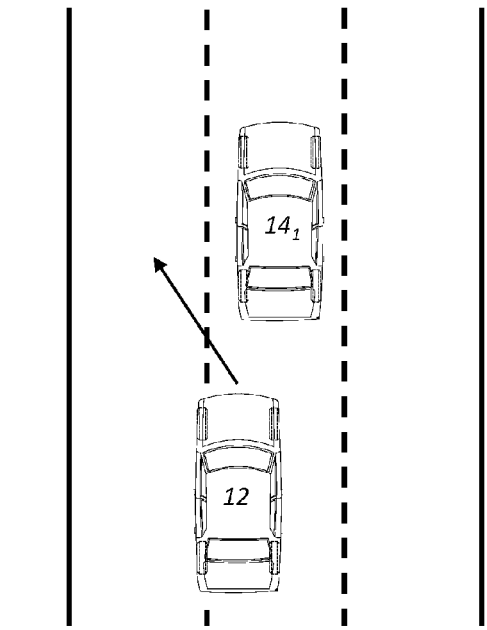
FIG. 2B is a schematic view illustrating a scenario of a host vehicle cutting out from a lane with a first target vehicle into a lane that is clear.
Figure 2C:
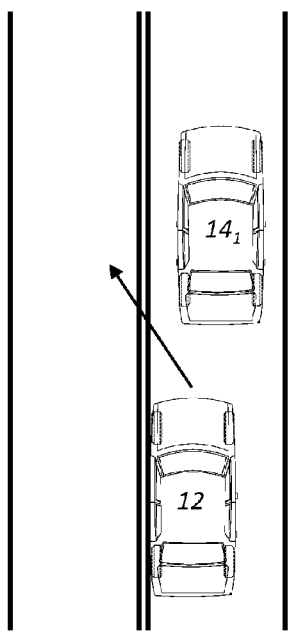
FIG. 2C is a schematic view illustrating a scenario of a host vehicle cutting out from a lane with a first target vehicle into an opposing lane.
Figure 2D:
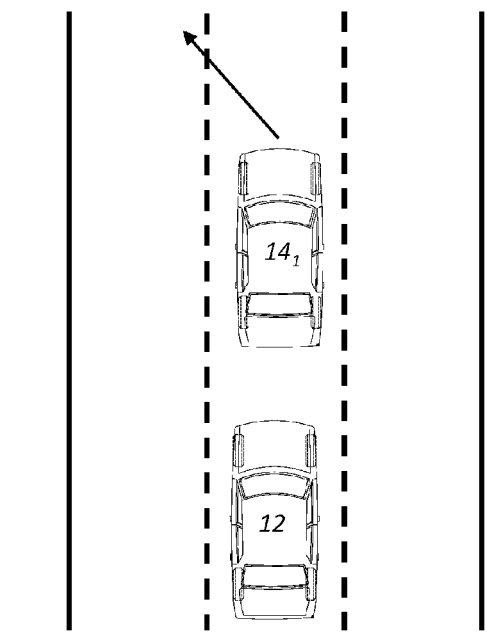
FIG. 2D is a schematic view illustrating a scenario of a target vehicle cutting out from a lane with a host vehicle into a second lane.

In one scenario wherein the host vehicle is cutting out to the left in an attempt to perform a lane change to the left, such as is shown in FIGS. 2A and 2B, the relative lateral velocity ($v_{lat}$) of the leading target vehicle is to the right, from the perspective of the host vehicle (i.e., when the host vehicle moves left, the target vehicle becomes located on the right side of the host vehicle, as is seen in FIG. 1). However, in the case where the target vehicle is cutting out to the right, the relative lateral velocity ($v_{lat}$) of the target vehicle would be to the right as well and, thus, the directionality of $v_{lat}$ is not, by itself, enough to determine which vehicle is cutting out. The same problem arises in determining whether the target vehicle is cutting to the left or whether the host vehicle is cutting to the right. Therefore, more information is needed to determine which vehicle is performing the cutout. Such information could be distances and/or rates of change of distances between the host vehicle and one or more lane markers on the roadway nearby or adjacent to the host or target vehicle.

In one embodiment of step 241, the host vehicle may use processing device 44 of control module 40 to determine a relative lateral velocity ($v_{lat}$) of a target vehicle $14_1$. Generally speaking, the relative lateral velocity equals the rate of change of the relative lateral position as a function of time ($v_{lat}=\Delta x_{lat}/\Delta t$). For example, the vehicle may use target vehicle readings, as collected in step 210, to calculate a plurality of relative lateral positions ($x_{lat,1}$, $x_{lat,2}$, . . . $x_{lat,n}$) of the host vehicle 12 with respect to target vehicle $14_1$. The method may gather these readings and associate a timestamp with each corresponding $x_{lat}$ value. Then, with a plurality of $x_{lat}$ and timestamp pairs, the method may calculate the rate of change of the relative lateral position between the host vehicle and target vehicle by calculating the change in position as a function of time. This yields a relative lateral velocity that may be positive or negative depending on the lateral direction in which the target vehicle is moving with respect to the host vehicle (e.g., a positive $x_{lat}$ value indicates the target vehicle is to the right of the host vehicle, as shown in FIG. 1). To illustrate, if both vehicles are moving either right or left at the same rate (e.g., if both vehicles are cutting out), then the relative lateral velocity would equal zero. After calculation of one or more relative lateral velocities, the method may determine if the relative lateral velocity ($v_{lat}$) is to the right, to the left, or not to either side. In the latter case, this may be due to the fact that neither the host vehicle nor the target vehicle is cutting out, or may be due to the fact that both the host vehicle and the target vehicle are cutting out.

In step 242, the distance between the host vehicle and the left lane marker ($x_{left}$) is compared to the distance between the host vehicle and the right lane marker ($x_{right}$). As mentioned previously, this information can be used to aid the vehicle in determining whether the host vehicle is cutting out or whether the target vehicle is cutting out. For instance, the host vehicle cutting out to the left and the target vehicle cutting out to the left may (and most likely will) evaluate to the same result in step 241, thus, additional criteria is needed to identify which vehicle is starting to change lanes.

In one embodiment of step 242, the distances $x_{left}$ and $x_{right}$ are obtained from lane marking sensors 34 and 36, respectively, and are the distances between some reference point on the host vehicle 12 and the nearest lane marker on the respective side of the host vehicle, as shown in FIG. 1. After these distances are obtained, as may be the case in step 220, then the two distances are compared to one another. The distances may be compared by the processing device 44 in control module 40. In another embodiment, step 242 uses the direction of relative lateral velocity (from the previous step) to determine which side (left or right) to evaluate.

In step 243, it is determined whether the lesser of the two distances ($x_{left}$ or $x_{right}$ as determined in step 242) is decreasing at a monotonic rate and in the opposite direction of $v_{lat}$. As used herein, "monotonic rate" broadly means any rate that, when evaluated over a suitable period of time, is substantially increasing or decreasing, but not both. A suitable period of time may be the time it takes to begin or initiate a cutout maneuver. In a first scenario as shown in FIG. 2A, host vehicle 12 is following a slower target vehicle 14, and is cutting out to the left lane and, therefore, the distance $x_{left}$ is most likely less than the distance $x_{right}$. Further, the distance $x_{left}$ will be decreasing as the host vehicle 12 progresses into the left lane and in the opposite direction of $v_{lat}$, which would be to the right in this case. A plurality of distances $x_{left}$ may be calculated from information gathered in step 220. The vehicle may then compare the distances with one another to see whether the distances are decreasing at a monotonic rate and in the opposite direction of $v_{lat}$. If the distance $x_{left}$ was decreasing, but not in the opposite direction of $v_{lat}$ (e.g., the same direction of $v_{lat}$), then this may indicate that the target vehicle is performing a lane change, as will be illustrated in steps 245 to 248. If the lesser distance is decreasing at a monotonic rate and in the opposite direction of $v_{lat}$, the method continues to step 244; otherwise, the method continues to step 245.

Upon reaching step 244, the method determines that the host vehicle is cutting out and most likely is changing lanes. The information used in these determinations may be gathered from some combination of sensors 20-36 (see steps 210 and 220) and the results of these determinations may be stored in memory device 42 of control module 40 or other memory device, along with other information pertaining to this determination and/or values, readings, or calculations. This information can then be used by the host vehicle 12 to determine an acceleration profile which the host vehicle may then operate according to.

In step 245, the vehicle determines whether $x_{left,T}$ or $x_{right,T}$ is the lesser of the two. This step is analogous to step 242 and may be carried out in a like manner. However, the two distances, $x_{left,T}$ and $x_{right,T}$ are calculated with respect to the target vehicle $14_1$. For example, sensor 30 may include a camera that may capture images in front of the vehicle 12, which may then be used to determine the distances between the target vehicle $14_1$ and lane markers— e.g., $x_{left,T}$ is the distance between the left side of target vehicle $14_1$ and lane marker $18_2$ and $x_{right,T}$ is the distance between the right side of target vehicle $14_1$ and lane marker $18_3$. After the lesser of the two distances are determined (e.g., in FIG. 1, $x_{right,T}$ is less than $x_{left,T}$), the method continues to step 246.

In step 246, it is determined whether the lesser of the two distances ($x_{left}$ or $x_{right}$ as determined in step 242) is decreasing at a monotonic rate and in the same direction of $v_{lat}$. This step is analogous to step 243 and, thus, may be executed in a like manner. However, this step involves the target vehicle $14_1$'s position with respect to the lane markers. For example, since, as shown in FIG. 1, $x_{right,T}$ is the lesser of the two distances, this step will determine if the distance $x_{right,T}$ is decreasing at a monotonic rate and in the same direction as $v_{lat}$. Here, if $x_{right,T}$ is decreasing at a monotonic rate and in the same direction as $v_{lat}$, then it the target vehicle is most likely cutting out to the right. If the lesser distance is decreasing at a monotonic rate and in the opposite direction of $v_{lat}$, the method continues to step 247; otherwise, the method continues to step 248.

Upon reaching step 247, it has been determined that the target vehicle is cutting out to the side which the relative lateral velocity ($v_{lat}$) is directed, as determined in step 241. For example, if it is determined that the relative velocity ($v_{lat}$) of the target vehicle is to the right and $x_{right,T}$ is decreasing at a monotonic rate, then the target vehicle is cutting out to the right and most likely making a lane change to the right. Similarly, this information may be stored in memory device 42 of control module 40 or other memory device, along with other information. The method then continues with step 250. Other methods of confirming a cutout by the leading target vehicle 14 may be used, such as by confirming that the target vehicle 14 is no longer in front of the host vehicle 12 with target vehicle sensor 30.

Upon reaching step 248, it has been determined that neither the target vehicle nor the host vehicle is cutting out. However, it may be the case that both the host vehicle and the target vehicle are cutting out in the same direction. If the direction of the relative lateral velocity ($v_{lat}$) is neither to the right nor the left, but the lesser of the two distances is decreasing at a monotonic rate, then both the host vehicle and the target vehicle are cutting out and most likely changing lanes. The vehicle(s), in these cases, will be making a cutout to the side to which the distance is decreasing. For example, if $x_{left}$ is less than $x_{right}$ and the other conditions are satisfied, then the host vehicle is probably making a left lane change, such as is seen in FIGS. 2A and 2B. However, if neither distance is decreasing at a monotonic rate for a sufficient amount of time, then neither vehicle is likely performing a cutout.

In steps 244, 247, and/or 248, the determination of whether the host vehicle or target vehicle is cutting out may be corroborated by other indications obtained by the host vehicle. For example, the host vehicle may determine that a host vehicle operator turned on the vehicle 12's turn signal. Also, the host vehicle may realize that a host vehicle operator is turning the steering wheel thereby providing further information to corroborate the determinations in steps 244, 247, and/or 248. Additionally, through use of sensor 30, which may be a camera, or a vehicle-to-vehicle (V2V) system, the host vehicle 12 may obtain information indicating that the target vehicle $14_1$ is cutting out towards a certain direction, such as the activation of turn signals or other information regarding target vehicle $14_1$. Any other useful information that may be obtained by sensors 20-36 may be used by host vehicle 12 to corroborate the determinations in step 240 as well, such as traffic or positioning information obtained at vehicle modules and/or via V2V communications.

Referring back now to FIG. 3, in step 250, when the cutout maneuver is being performed by the host vehicle, the method confirms the availability of an adjacent lane before accelerating the host vehicle. The adjacent lane confirmation is at least partially based on a presence or absence of an additional target vehicle in the adjacent lane. For example, in FIG. 2A, the target vehicle $14_2$ is in an adjacent lane, namely the adjacent lane to which host vehicle 12 seeks to cut out towards. In this instance, information may be gathered upon reaching this step, in step 210 and/or in step 220 that pertains to the presence or absence of an additional target vehicle or other object (e.g., a traffic cone).

For example, referring back to step 210, not only may the target vehicle sensors 30-32 be used to confirm that a target vehicle $14_1$ is leading host vehicle 12, but the target vehicle sensors may detect an additional vehicle $14_2$ in an adjacent lane, such as is the case in FIG. 2A. In another example, in step 220, the lane marking sensors 34-36 may include cameras that are capable of capturing images of the adjacent lanes wherein a target vehicle $14_2$ is located and, through image processing, may determine that the image shows a target vehicle or object in an adjacent lane. In a third example, the host vehicle 12, upon reaching step 250, may operate target vehicle sensors 30-32 to get updated readings of the adjacent lane and additional target vehicle $14_2$. This last example may be preferable in some instances when, for instance, the vehicle is part-way through its cutout maneuver and, therefore, has a clearer path of detection in the adjacent lane to which it is cutting out towards. In this case, vehicle $14_1$ may not be as obtrusive to the target vehicle sensors with respect to detecting a second target vehicle $14_2$. Furthermore, the host vehicle may determine whether this additional target vehicle $14_2$ is in the adjacent lane to which the host vehicle is cutting out towards (see step 244). These steps may be carried out by processing device 44 of control module 40 and/or by the one or more sensors 20-26 and/or 30-36 included in the vehicle. The method then continues to step 260.

In step 260, the automated driving system controls the acceleration of the host vehicle during the lane cutout maneuver. The acceleration control is at least partially based on the lane cutout maneuver prediction (step 230), the lane cutout maneuver determination (step 240), and/or the adjacent lane confirmation (step 250). Additionally, the acceleration control may also be carried out based on other information regarding the host vehicle 12, one or more target vehicles 14 (e.g., the presence of, and/or any other information pertaining to, a leading vehicle, a trailing vehicle, an adjacently located vehicle), environmental factors (e.g., weather, potential road conditions due to the weather), roadway factors (e.g., slope, pitch, and/or curve of the roadway; number of lanes; dashed versus solid lane markings; speed limit of the roadway), or any other information that may be used to determine an appropriate acceleration control of the host vehicle 12.

Figure 5:
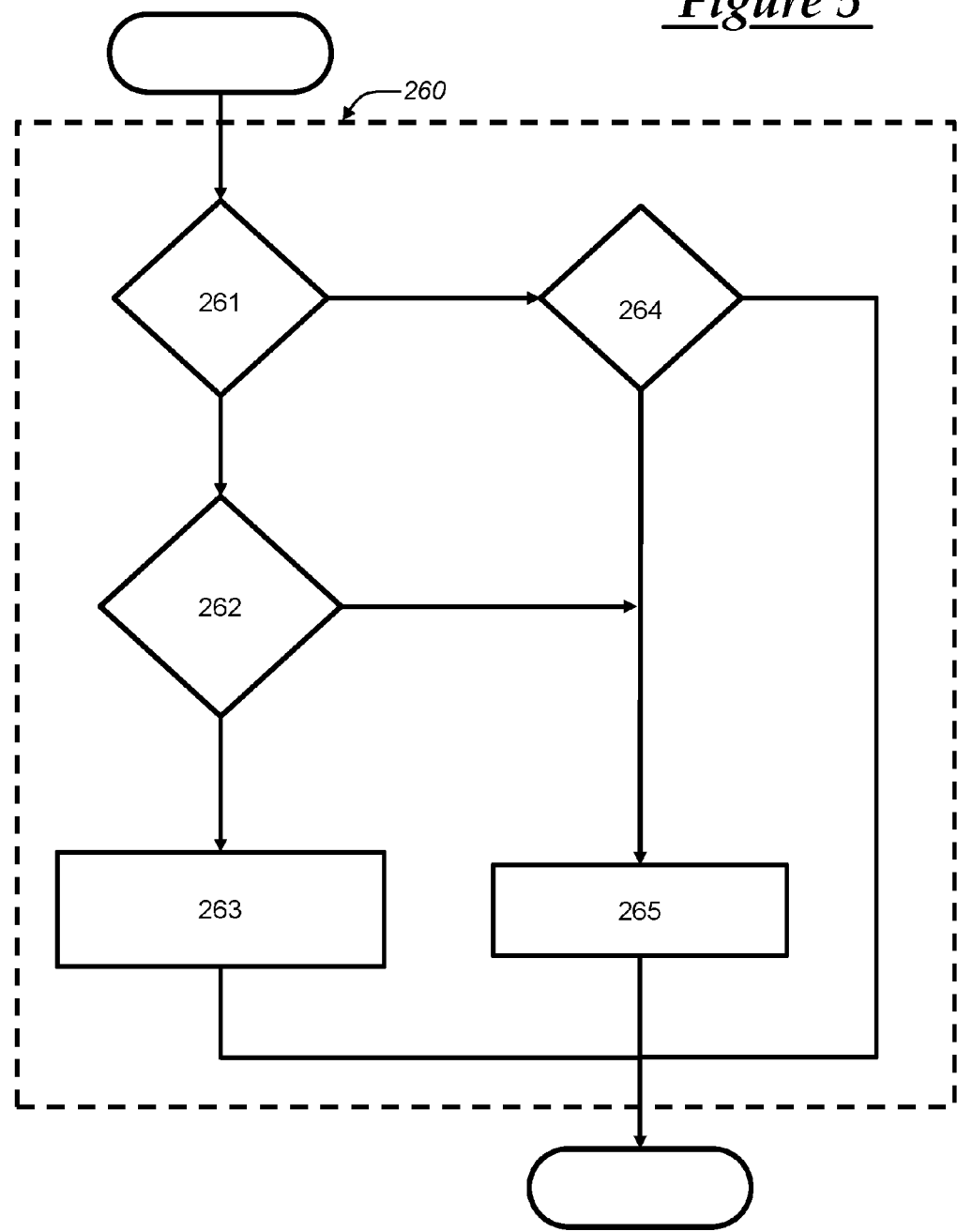
FIG. 5 is a flowchart illustrating an exemplary embodiment of a controlling step of the method illustrated in FIG. 3.

Referring now to FIG. 5, there is provided a flowchart illustrating an exemplary embodiment of a controlling step 260 of the method 200. The exemplary embodiment of step 260 contains steps 261-265 and is carried out after step 250. As mentioned previously, the present method may be used with any number of autonomous or semi-autonomous vehicle systems, but is particularly well suited for adaptive cruise control (ACC) systems. Thus, the following description is directed to an example of step 260 where an ACC system automatically controls acceleration, while a driver controls steering. Therefore, the following example does not address issues like whether or not a certain lane change should be made, as it is assumed the driver is in control of steering. Such features could, however, be added to the present system and method. In step 261, the method decides whether the host vehicle 12 is cutting out or whether the leading target vehicle is cutting out. This determination was already made in step 240 and, therefore, this step 261 may merely include recalling from memory this information. Upon the determination that the host vehicle 12 is cutting out, the method continues to step 262; otherwise, the method continues to step 264.

In step 262, the automated driving system 10 determines whether the adjacent lane towards which the host vehicle 12 is cutting out is moving faster, and/or is clear. As used herein, when referring to whether a lane is "moving faster", this means that the lane which is "moving faster" contains traffic (e.g., target vehicles) that is traveling down the road at a faster speed relative to the host vehicle 12, than the traffic in the host vehicle's current lane. For example, in FIG. 2A, if vehicle $14_2$ is travelling faster than vehicle $14_1$ with respect to host vehicle 12, then it could be said that the left lane is "moving faster" than the center lane. Similarly, if vehicle $14_2$ was in the left lane but was trailing vehicle 12, the left-most lane may still be regarded as "moving faster" because trailing vehicle $14_2$ is travelling at a higher speed than vehicle 12, even though the left lane may not be clear.

As used herein, a lane is "clear" if there is no vehicle in the lane that is leading host vehicle 12 by some distance. For example, in FIG. 2B, the host vehicle is shown as intending to cut out to the left lane. There is no vehicle located in the left lane that is leading vehicle 12 and, therefore, it can be said that the left lane is clear, at least with respect to vehicle 12. In FIG. 2A, the host vehicle 12 is seeking to cut out to the left lane, however, a target vehicle $14_2$ is located in the left lane and is leading vehicle 12. Therefore, this left lane is not "clear" at least with respect to vehicle 12. Also, if, as determined in step 240, the leading target vehicle and the host vehicle are both cutting out, then the lane is most likely not clear. In other embodiments, although a lane contains another vehicle, if that vehicle is not within a predetermined or certain distance to host vehicle 12 (i.e., very far ahead of the host vehicle), it may still be said that the lane is clear. In yet another embodiment, a lane to which the host vehicle is cutting out towards may be said to not be clear, even though there is no leading target vehicle in the lane, if there is a target vehicle in the lane that is approaching from behind, as determined by target vehicle sensor 32, for example. It should be appreciated that any number of known techniques for performing step 262 may be used.

In one embodiment of step 262, the automated driving system 10 may use information already gathered and/or stored in memory, such as electronic memory device 42 or control module 40. In other embodiments, the vehicle may, upon reaching this step, gather information via one or more sensors 20-26 and/or 30-36. In any event, the control module may use information pertaining to the host vehicle 12 and one or more target vehicles 14 to determine whether the adjacent lane to which the host vehicle is cutting out towards is clear and/or moving faster. If the adjacent lane is clear and/or moving faster, then the method continues to step 265; otherwise, the method continues to step 263.

In step 264, which is encountered when the leading target vehicle is cutting out or switching lanes (e.g., FIG. 2D), the method determines whether the host vehicle's current lane is clear. This determination may be made in a manner similar to the determination(s) made in step 262. For example, the target vehicle readings gathered in step 210 may be recalled from memory and then used to determine if there is a vehicle ahead of the target vehicle $14_1$. In another example, the method may use target vehicle sensor 30 to determine if there is a vehicle ahead of the host vehicle 12 in the current lane after the target vehicle $14_1$ completes its cutout to another lane. If the lane is clear, the method proceeds to step 265; otherwise, the method ends. In an alternate embodiment, other factors may be taken into consideration to determine whether the automated driving system should provide negative acceleration or positive acceleration to the host vehicle.

Upon reaching step 263, a negative acceleration is provided to the host vehicle. This step is encountered when the host vehicle is cutting out to another lane wherein traffic is moving slower than vehicle 12 and/or wherein the new lane is not clear. This scenario may be visualized through viewing FIG. 2A, assuming that vehicle 12 is moving faster than vehicle $14_2$. In this case, it is desirable to slow the velocity of host vehicle 12 via application of negative acceleration or negative torque. The processing device 44 in control module 40 may make this determination and, subsequently, may generate and/or send control signals to braking devices 50-56 and/or ECM 60. Depending on certain readings, measurements, or other information, the automated driving system 10 may determine the extent to which the vehicle's velocity must be slowed such that it does not contact another object (e.g., a target vehicle 14) and/or such that the transition between lanes is smooth or comfortable for the passenger(s). Such information that may be taken into account during this determination or generation of control signals are the speeds of vehicle 12 and target vehicles 14, the distance(s) between host vehicle 12 and target vehicle(s) 14, the speed limit of the roadway, the nature of the lane (e.g., whether it is the left-most lane (e.g., the fast lane), the right-most lane (e.g., the deceleration lane)), etc. Other information that can be useful may be roadway-related or other vehicle information obtained from an infotainment module, the control module 40, a telematics unit, a global positioning system (GPS), etc. It should be appreciated that there are numerous other scenarios wherein the automated driving system 10 may determine that host vehicle 12 should be provided with a negative acceleration. The method then ends.

Upon reaching step 265, a positive acceleration is provided to the host vehicle. This step is analogous to step 263, except that a positive acceleration is provided to the host vehicle. This step may be carried out, for example, when: (1) the host vehicle cuts out to a lane that is moving faster (see FIG. 2A wherein it target vehicle $14_2$ is traversing the road at a higher speed than host vehicle 12); (2) the host vehicle cuts to a lane that is clear (see FIG. 2B); or (3) a leading target vehicle $14_1$ cuts out to another lane, leaving host vehicle 12 with in a clear lane (see FIG. 2D). However, if it is determined that the lane marker between the host vehicle's current lane and the adjacent lane towards which the vehicle 12 is cutting out to is a solid line (e.g., as is the case shown in FIG. 2C), then no additional torque is provided. It should be appreciated that there are numerous other scenarios wherein the automated driving system 10 may determine that host vehicle 12 should be provided with a positive acceleration. The method then ends.

Steps 263 and/or 265 may employ any number of techniques and methods from known autonomous or semi-autonomous driving systems to help carry out the deceleration and/or acceleration actions described above. As an example, if the host vehicle is cutting out towards a solid lane marking (i.e., no passing allowed), then the method may not provide additional acceleration without consulting other sensor readings. As another example, if the host vehicle begins cutting out to the left and the leading target vehicle $14_1$ has its left turn signal on, this may also cause the method to avoid additional acceleration so that the two vehicles do not collide. Various acceleration profiles could be used based on factors such as which vehicle is cutting out, whether the host vehicle is overtaking another vehicle, whether the host vehicle is crossing a solid line, etc.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method for use with an automated driving system installed on a host vehicle, the automated driving system comprises one or more automated driving sensor(s) and an automated driving control unit, and the method comprises the steps of:
    gathering target vehicle readings and lane marking readings from the one or more automated driving sensor(s);
    determining a relative lateral position ($x_{lat}$) of the host vehicle with respect to a leading target vehicle in the same lane as the host vehicle based, at least in part, on the target vehicle readings;
    predicting a lane cutout maneuver by the host vehicle or the leading target vehicle using the target vehicle readings, the lane cutout maneuver is a maneuver where the host vehicle or the leading target vehicle intentionally initiates or at least partially begins a lane change or lane departure from a current lane, the lane cutout maneuver prediction is at least partially based on the relative lateral position ($x_{lat}$) of the host vehicle with respect to the leading target vehicle;
    determining whether the lane cutout maneuver is being performed by the host vehicle, by the leading target vehicle, or by both the host and the leading target vehicles, the lane cutout maneuver determination is at least partially based on a lateral distance between the host vehicle and a lane marking ($x_{right}$, $x_{left}$) and the target vehicle readings; and
    controlling acceleration of the host vehicle with the automated driving system during the lane cutout maneuver, wherein the acceleration control is at least partially based on the lane cutout maneuver prediction and the lane cutout maneuver determination.

2. The method of claim 1, wherein the gathering step further comprises gathering the target vehicle readings from one or more target sensor(s) mounted on the host vehicle.

3. The method of claim 1, wherein the gathering step further comprises gathering the lane marking readings from one or more lane marking sensor(s) mounted on the host vehicle, and determining the lateral distance between the host vehicle and the lane marking ($x_{right}$, $x_{left}$) based, at least in part, on the lane marking readings.

4. The method each of claim 3, wherein each of the lane marking sensor(s) includes a camera that captures images of a road surface adjacent the host vehicle, and the gathering step further comprises gathering the images of the adjacent road surface from the camera and processing the images to obtain the lane marking readings.

5. The method of claim 1, wherein the predicting step further comprises predicting a beginning of the lane cutout maneuver by the host vehicle or the leading target vehicle at least partially based on a change in the relative lateral position ($x_{lat}$) of the host vehicle with respect to the leading target vehicle over a suitable period of time.

6. The method of claim 1, wherein the determining step further comprises calculating a relative lateral velocity ($v_{lat}$) between the host vehicle and the leading target vehicle based on a rate of change in a plurality of relative lateral position values ($x_{lat1} \ldots x_{latx}$) over a suitable period of time, deciding the direction of the relative lateral velocity ($v_{lat}$) of the host vehicle, with respect to the leading target vehicle, based on whether the relative lateral velocity ($v_{lat}$) is a positive or negative value, and determining if the lane cutout maneuver is being performed by the host vehicle, by the leading target vehicle, or by both the host and the leading target vehicles at least partially based on the direction of the relative lateral velocity ($v_{lat}$).

7. The method of claim 1, wherein the determining step further comprises using the lane marking readings to obtain a lateral distance between the host vehicle and a lane marking on the left side of the host vehicle ($x_{left}$) and to obtain a lateral distance between the host vehicle and a lane marking on the right side of the host vehicle ($x_{right}$), comparing the distances between the host vehicle and the lane markings on the left and right sides of the host vehicle ($x_{right}$, $x_{left}$) to decide which distance is the lesser of the two, and determining if the lane cutout maneuver is being performed by the host vehicle, by the leading target vehicle, or by both the host and the leading target vehicles at least partially based on the lesser of the two distances ($x_{right}$, $x_{left}$).

8. The method of claim 1, wherein the determining step further comprises calculating a rate of change in at least one of a lateral distance between the host vehicle and a lane marking on the left side of the host vehicle ($x_{left}$) or a lateral distance between the host vehicle and a lane marking on the right side of the host vehicle ($x_{right}$), deciding if the rate of change in the at least one lateral distance ($x_{right}$, $x_{left}$) is decreasing at a monotonic rate, and determining if the lane cutout maneuver is being performed by the host vehicle, by the leading target vehicle, or by both the host and the leading target vehicles at least partially based on whether the rate of change is decreasing at the monotonic rate.

9. The method of claim 1, wherein the determining step further comprises calculating a direction of a relative lateral velocity ($v_{lat}$) of the host vehicle, with respect to the leading target vehicle, deciding if a lateral distance between the host vehicle and a lane marking on a left side ($x_{left}$) is less than a lateral distance between the host vehicle and a lane marking on a right side ($x_{right}$), and deciding if the lesser of the two lateral distances ($x_{right}$, $x_{left}$) is decreasing at a monotonic rate.

10. The method of claim 9, wherein when the direction of the relative lateral velocity ($v_{lat}$) of the host vehicle is to the left, the lateral distance between the host vehicle and the lane marking on a left side ($x_{left}$) is the lesser of the two lateral distances, and the lateral distance ($x_{left}$) is decreasing at the monotonic rate, then determining the lane cutout maneuver is being performed by the host vehicle and is to the left; and wherein when the direction of the relative lateral velocity ($v_{lat}$) of the host vehicle is to the right, the lateral distance between the host vehicle and the lane marking on a right side ($x_{right}$) is the lesser of the two lateral distances, and the lateral distance ($x_{right}$) is decreasing at the monotonic rate, then determining the lane cutout maneuver is being performed by the host vehicle and is to the right.

11. The method of claim 1, wherein the determining step further comprises calculating a direction of a relative lateral velocity ($v_{lat}$) of the host vehicle, with respect to the leading target vehicle, deciding if a lateral distance between the leading target vehicle and a lane marking on a left side ($x_{left,T}$) is less than a lateral distance between the leading target vehicle and a lane marking on a right side ($x_{right,T}$), and deciding if the lesser of the two lateral distances ($x_{right,T}$, $x_{left,T}$) is decreasing at a monotonic rate.

12. The method of claim 11, wherein when the direction of the relative lateral velocity ($v_{lat}$) of the host vehicle is to the left, the lateral distance between the leading target vehicle and the lane marking on a right side ($x_{right,T}$) is the lesser of the two lateral distances, and the lateral distance ($x_{right,T}$) is decreasing at the monotonic rate, then determining the lane cutout maneuver is being performed by the leading target vehicle and is to the right; and wherein when the direction of the relative lateral velocity ($v_{lat}$) of the host vehicle is to the right, the lateral distance between the leading target vehicle and the lane marking on a left side ($x_{left,T}$) is the lesser of the two lateral distances, and the lateral distance ($x_{left,T}$) is decreasing at the monotonic rate, then determining the lane cutout maneuver is being performed by the leading target vehicle and is to the left.

13. The method of claim 1, wherein when it is determined that the lane cutout maneuver is being performed by the host vehicle, then the controlling step further comprises:
determining if traffic in an adjacent lane is moving faster than traffic in a current lane and if the adjacent lane is clear; and
increasing the acceleration of the host vehicle with the automated driving system when it is determined that the adjacent lane is moving faster than traffic in the current lane and the adjacent lane is clear.

14. The method of claim 13, wherein the controlling step further comprises determining whether the lane marking between the current lane and the adjacent lane is a solid line, and providing no additional acceleration of the host vehicle with the automated driving system when the lane marking between the current lane and the adjacent lane is a solid line.

15. The method of claim 1, wherein when it is determined that the lane cutout maneuver is being performed by the leading target vehicle, then the controlling step further comprises determining if traffic in a current lane is clear before increasing the acceleration of the host vehicle with the automated driving system.

16. The method of claim 1, wherein the controlling step further comprises determining that the lane cutout maneuver is being performed by both the leading target vehicle and the host vehicle in the same direction, and providing no additional acceleration of the host vehicle with the automated driving system when the lane cutout maneuver is being performed by both the leading target vehicle and the host vehicle in the same direction.

17. The method of claim 1, wherein the controlling step further comprises determining if a turn signal of the leading target vehicle is activated in a same direction as the cutout maneuver of the host vehicle, and providing no additional acceleration of the host vehicle with the automated driving system when the turn signal of the leading target vehicle is activated in the same direction as the cutout maneuver of the host vehicle.

18. The method of claim 1, wherein the controlling step further comprises controlling acceleration of the host vehicle in an anticipatory manner so that a torque increase is requested by the automated driving system before either the host vehicle or the leading target vehicle completes the cutout maneuver.

19. The method of claim 1, wherein the automated driving system is part of an adaptive cruise control (ACC) system that automatically controls a velocity of the host vehicle based, at least in part, on a desired velocity provided by a driver.

20. A method for use with an automated driving system installed on a host vehicle, the automated driving system comprises one or more automated driving sensor(s) and an automated driving control unit, and the method comprises the steps of:
gathering target vehicle readings and lane marking readings from the one or more automated driving sensor(s);
determining if a lane cutout maneuver is being performed by the host vehicle, by a leading target vehicle, or by both the host and the leading target vehicles, the lane cutout maneuver determination is at least partially based on a lateral distance between the host vehicle and a lane marking ($x_{right}$, $x_{left}$) and at least partially based on the target vehicle readings;

confirming an availability of an adjacent lane when the lane cutout maneuver is being performed by the host vehicle or confirming an availability of a current lane when the lane cutout maneuver is being performed by the leading target vehicle; and controlling acceleration of the host vehicle with the automated driving system during the lane cutout maneuver, wherein the acceleration control is at least partially based on the lane cutout maneuver determination and the adjacent lane or current lane availability confirmation.

21. An automated driving system installed in a host vehicle, comprising:

one or more automated driving sensor(s) configured to gather target vehicle readings and lane marking readings; and an automated driving control unit configured to:

determining a relative lateral position ($x_{lat}$) of the host vehicle with respect to a leading target vehicle in the same lane as the host vehicle based, at least in part, on the target vehicle readings;

predict a lane cutout maneuver by the host vehicle or the leading target vehicle using the target vehicle readings, the lane cutout maneuver is a maneuver where the host vehicle or the leading target vehicle intentionally initiates or at least partially begins a lane change or lane departure from a current lane, wherein the lane cutout maneuver prediction is at least partially based on the relative lateral position ($x_{lat}$) of the host vehicle with respect to the leading target vehicle;

determine if the lane cutout maneuver is being performed by at least one of the host vehicle, the leading target vehicle, or both the host and the leading target vehicles, wherein the lane cutout maneuver determination is at least partially based on a lateral distance between the host vehicle and a lane marking ($x_{right}$, $x_{left}$) and at least partially based on the target vehicle readings; and control acceleration of the host vehicle with the automated driving system during the lane cutout maneuver, wherein the acceleration control is at least partially based on the lane cutout maneuver prediction and the lane cutout maneuver determination.

* * * * *